(12) United States Patent
Torii et al.

(10) Patent No.: US 7,556,792 B2
(45) Date of Patent: Jul. 7, 2009

(54) METHOD FOR PREPARING PEROVSKITE COMPLEX OXIDE POWDER OF FORMULA ABO3

(75) Inventors: Atsuhiro Torii, Otsu (JP); Shinichi Kato, Shiga-ken (JP); Tomohisa Tonogaki, Shiga-ken (JP); Masaru Kojima, Hikone (JP); Kenji Tanaka, Shiga-ken (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 373 days.

(21) Appl. No.: 10/330,254

(22) Filed: Dec. 30, 2002

(65) Prior Publication Data

US 2004/0028601 A1 Feb. 12, 2004

(30) Foreign Application Priority Data

Dec. 28, 2001 (JP) ............................ 2001-401021
Dec. 6, 2002 (JP) ............................ 2002-355073

(51) Int. Cl.
*C01G 23/00* (2006.01)

(52) U.S. Cl. ................... 423/593.1; 423/598; 501/134; 501/135; 501/136; 501/137

(58) Field of Classification Search ................ 423/598, 423/593.1; 501/134, 135, 136, 137
See application file for complete search history.

(56) References Cited

U.S. PATENT DOCUMENTS

| | | | | |
|---|---|---|---|---|
| 3,472,776 A | * | 10/1969 | Derbyshire | 252/62.9 R |
| 3,481,697 A | * | 12/1969 | Figuet et al. | 423/79 |
| 4,764,493 A | * | 8/1988 | Lilley et al. | 501/137 |
| 4,832,939 A | * | 5/1989 | Menashi et al. | 423/598 |
| 4,859,448 A | * | 8/1989 | Klee et al. | 423/598 |
| 5,445,806 A | * | 8/1995 | Kinugasa et al. | 423/598 |

FOREIGN PATENT DOCUMENTS

| | | |
|---|---|---|
| CN | 1311173 A1 | 9/2001 |
| JP | 59-39726 | 5/1984 |
| JP | 61-31345 | 2/1986 |
| JP | 62-260703 | 11/1987 |
| JP | 62-297214 | 12/1987 |
| JP | 63-74915 | 4/1988 |
| JP | 64-028283 | 1/1989 |
| JP | 01-167228 | 6/1989 |
| JP | 2-39451 | 5/1990 |
| JP | 05-058631 | 3/1993 |
| JP | 6-48734 | 2/1994 |
| JP | 8-32559 | 3/1996 |
| JP | 08-119633 | 5/1996 |

OTHER PUBLICATIONS

Kubo, K. et al., "Wet process for synthesizing barium titanate", Journal of Chemical Industry by The Chemical Society of Japan, vol. 71, No. 1, 114-118 (1968).
Chinese Office Action dated Feb. 20, 2004.
Kagaku Benran (Chemistry Handbook), Basic Edition, Third Revised Edition II, pp. 166-167, Dec. 20, 1999.

* cited by examiner

*Primary Examiner*—Steven Bos
(74) *Attorney, Agent, or Firm*—Dickstein Shapiro LLP

(57) ABSTRACT

$Ba(OH)_2 \cdot 8H_2O$ is fused by heating. The fused $Ba(OH)_2$ is allowed to react with $TiO_2$ powder having a specific surface area of 250 $m^2/g$ or more to prepare a cubic crystalline $BaTiO_3$ having high crystallinity. The $BaTiO_3$ is calcined to yield a fine, tetragonal crystalline $BaTiO_3$ powder having high crystallinity. Thus, a high quality $BaTiO_3$ having high crystallinity can be prepared at a low cost.

9 Claims, 14 Drawing Sheets

METHOD FOR PREPARING PEROVSKITE COMPLEX OXIDE POWDER OF FORMULA ABO3

BACKGROUND OF THE INVENTION

1. Field of the Invention

The present invention relates to methods for manufacturing a complex oxide powder and complex oxide powders, and particularly to a method for manufacturing a complex oxide powder used for electronic materials, such as dielectric ceramics, and a complex oxide powder prepared by the method.

2. Description of the Related Art

Monolithic capacitors have recently been miniaturized with their capacitance becoming larger, and accordingly, the thickness of dielectric elements has become smaller. In order to manufacture such a laminated monolithic capacitor, the crystal grains of dielectric ceramics need to be small and the crystal growth of the grains must be suppressed. Accordingly, complex oxides constituting the ceramics are required to have a small grain size and high crystallinity.

Barium titanate ($BaTiO_3$) powder has been typically used as such a complex oxide, and a wet synthesis (Kubo, K. et al., "Wet process for synthesizing barium titanate", Journal of Chemical Industry by The Chemical Society of Japan, Vol. 71, No. 1, 114-118 (1968)) is widely known as a method for preparing $BaTiO_3$ powder.

In this method, barium hydroxide octahydrate ($Ba(OH)_2 \cdot 8H_2O$) and a titanium oxide ($TiO_2$) gel containing about 95% of water are mechanically triturated and mixed to react with each other while carbon dioxide is removed. The resulting precipitate is separated from the reaction product. Then, acetic acid (6 N) is added to the precipitate, followed by heating to 50° C. Unreacted $Ba(OH)_2$ and the by-products $BaCO_3$ and $Ba_2TiO_4$ are dissolved and extracted. The remaining precipitate is washed with water and dried to yield the $BaTiO_3$.

As for another method, a hydrolysis method is disclosed in Japanese Examined Patent Application Publication No. 3-39014. In this method, a product from hydrolysis of a titanium compound and a water-soluble barium salt are allowed to react with each other in a strong alkaline aqueous solution to yield $BaTiO_3$ fine particles. Specifically, this publication describes creating a product from the hydrolysis of a titanium compound, such as $TiCl_4$, and $Ba(NO_3)_2$, in a strong alkaline aqueous solution, such as KOH or NaOH of pH 13.0 or more, to yield cubic crystalline $BaTiO_3$.

A pulverization method, hydrothermal synthesis, sol-gel method, and alkoxidehydroxide route are also known as methods for preparing $BaTiO_3$ powder.

The pulverization method is suitable for preparing a fine particle material at a low cost. In the pulverization method, a mixture of $BaCO_3$ and $TiO_2$ is mechanically pulverized and uniformly mixed using a ball mill, a sand mill, or the like. The resulting fine particles are dried and calcined to yield the $BaTiO_3$ powder.

In the hydrothermal synthesis, an active titanium entity ($[Ti(OH)_6]^{2-}$) having a number of hydroxyl groups and a large specific surface area is prepared, in advance, by hydrolysis of $TiCl_4$ or titanium alkoxide. This active titanium entity is heated under a high pressure with $Ba(OH)_2$ in an autoclave so that barium ions ($Ba^{2+}$) diffuse into $TiO_2$ to synthesize the $BaTiO_3$.

In the sol-gel method, a titanium compound is allowed to directly react with a barium compound. A mixed solution of titanium alkoxide and barium alkoxide may used as a starting material, or a solution of an alkoxide precursor including titanium and barium at a ratio derived from the stoichiometry may be used as the starting material.

In the alkoxide-hydroxide route, titanium alkoxide is hydrolyzed in a solution containing $Ba^{2+}$ to yield $BaTiO_3$. When titanium alkoxide is hydrolyzed in a $Ba(OH)_2$ solution, the alkoxide solution becomes clouded immediately. Specifically, $TiO_2$ (or $[Ti(OH)_6]^{2-}$) is first produced in the $Ba(OH)_2$ solution, and then the $TiO_2$ (or $[Ti(OH)_6]^{2-}$) reacts with $Ba^{2+}$. Thus, by diffusing the $Ba^{2+}$ into the $TiO_2$, as in the hydrothermal synthesis, $BaTiO_3$ is prepared.

However, the wet synthesis needs to separate unreacted $Ba(OH)_2$ from the precipitate, and also to extract by-produced $BaCO_3$ and $Ba_2TiO_4$ by dissolution to separate them from the $BaTiO_3$. Thus, the wet synthesis is complicated. In addition, the resulting $BaTiO_3$ is likely to contain $Ba_2TiO_4$, and thus the $BaTiO_3$ crystals could be imperfect.

Also, since the concentration of $TiO_2$ is low due to the use of $TiO_2$ containing 95% water, the reaction between $TiO_2$ and $Ba(OH)_2$ does not efficiently proceed.

Furthermore, since the dissolution is performed with an acid, such as acetic acid, the resulting crystals are likely to be damaged, or $Ba^{2+}$ could be eluted to vary the mole fractions of the $BaTiO_3$.

In the hydrolysis method, an alkali metal, such as K or Na, is likely to adhere to the resulting $BaTiO_3$ because the reaction of a product from hydrolysis of a titanium compound with a water-soluble barium salt is conducted in a strong alkaline aqueous solution of pH 13.0 or more. As a result, impurities which cause failure in insulation resistance remain in $BaTiO_3$ in several hundreds of ppm even if the resulting $BaTiO_3$ is washed. Therefore, such $BaTiO_3$ is not suitable for a dielectric ceramic material which needs to be laminated.

In the pulverization method, zirconia or the like contained in pulverizing media of the ball mill or the like could be mixed into $BaTiO_3$. Thus, it is difficult to prepare a pure $BaTiO_3$ powder. Also, since $BaCO_3$ and $TiO_2$ pulverized in this method have a relatively large particle size, the degree of pulverization is limited. Specifically, these materials have extensive particle size distributions and their particles do not grow uniformly. It is therefore difficult to make the resulting ceramic particle size small and uniform.

The hydrothermal synthesis requires large equipment and batch processes, and consequently, workability and manufacturing efficiency are degraded. Thus, the hydrothermal synthesis limits the ability to effect cost reduction and increases costs.

In the sol-gel method, cubic crystalline $BaTiO_3$ can be obtained by calcination at about 400° C. However, this method must be performed in a dry atmosphere because barium alkoxide is liable to react with water violently in the atmosphere to emit smoke. Also, the alkoxides used as the starting material are undesirably expensive.

In the alkoxide-hydroxide route, titanium alkoxide is dissolved in $Ba(OH)_2$ to synthesize barium titanate. However, in order to complete this reaction, an excessive amount of $Ba(OH)_2$ is required, or NaOH or KOH must be added.

If $Ba(OH)_2$ is used excessively, $Ba^{2+}$ remains in the solution after the reaction, thus making it difficult to control the composition of $BaTiO_3$. Also, equipment for recovering barium is necessary.

If NaOH or KOH is added, $Na^+$ or $K^+$ remains in the solution after the reaction, thus interfusing into the resulting $BaTiO_3$ to act as an impurity. Thus, it is difficult to prepare pure $BaTiO_3$.

Furthermore, since hydrolysis of an alkoxide by-produces an alcohol which is a hazardous organic solvent, explosion proof equipment is needed, increasing costs.

SUMMARY OF THE INVENTION

Accordingly, the object of the present invention is to provide a method for manufacturing a high-quality complex oxide fine particle powder, such as barium titanate powder, having a high crystallinity at a low cost, and to provide a complex oxide powder prepared by the method.

The inventors of the present invention have conducted intensive research to achieve a fine, highly crystalline barium titanate powder by a simple method. As a result, it has been shown that, by fusing barium hydroxide octahydrate (Ba$(OH)_2 \cdot 8H_2O$) by heating, a high concentration of active barium solution can be prepared, and that, by allowing the barium solution to react with titanium oxide ($TiO_2$) powder, a pure, fine $BaTiO_3$ powder can be easily prepared. In addition, this method may be applied to other complex oxides similar to $BaTiO_3$.

According to an aspect of the present invention, a method is provided for preparing a complex oxide powder having a perovskite structure expressed by the general formula $ABO_3$. The method includes a fusion step of fusing a hydroxide of an element constituting the A site of the general formula $ABO_3$ by heating. The hydroxide contains crystal water. The method also includes a reaction step of allowing the fused hydroxide to react with an oxide powder of an element constituting the B site of the general formula $ABO_3$ to yield a reaction product. The oxide powder of the B site element comprises specific ultrafine particles.

When the complex oxide powder is $BaTiO_3$, $Ba(OH)_2 \cdot 8H_2O$ may be used as the hydroxide and $TiO_2$ powder may be used as the ultrafine oxide powder.

In other words, the hydroxide may be $Ba(OH)_2 \cdot 8H_2O$ in the method of the present invention and the oxide powder of the B site element may be $TiO_2$ powder. Thus, a desired $BaTiO_3$ powder can be prepared at a low cost.

Instead of a hydroxide containing crystal water, an anhydrous hydroxide containing an amount of water equivalent to the amount of the crystal water can be used.

Accordingly, the present invention is also directed to a method for preparing a complex oxide powder having a perovskite structure expressed by the general formula $ABO_3$. The method includes a dissolution step of dissolving an anhydrous hydroxide of an element constituting the A site of the general formula $ABO_3$ in a predetermined amount of water. The method also includes a reaction step of allowing the dissolved hydroxide to react with an oxide powder of an element constituting the B site of the general formula $ABO_3$ to yield a reaction product. The oxide powder of the B site element comprises specific ultrafine particles. The amount of water may be equivalent to the amount of crystal water contained in a hydrous hydroxide of the element constituting the A site.

When the complex oxide powder is $BaTiO_3$, $Ba(OH)_2$ may be used as the hydroxide and $TiO_2$ powder may be used as the ultrafine oxide powder.

In other words, the anhydrous hydroxide may be $Ba(OH)_2$ in the method of the present invention and the oxide powder of the B site element may be $TiO_2$ powder. Thus, a desired $BaTiO_3$ powder can be prepared at a low cost.

In order to prepare an ultrafine final product, or the complex oxide, having high crystallinity, the oxide powder used as a material must be ultrafine and highly crystalline.

Preferably, the ultrafine specific particles have a specific surface area of about 250 $m^2/g$ or more.

By using an oxide powder having a specific surface area of about 250 $m^2/g$ or more, the formation of heterogeneous phases can be as suppressed as much as possible. Thus, an ultrafine, highly crystalline complex oxide powder can be prepared.

Preferably, the hydroxide and the oxide powder are weighed such that the mole ratio of the A site element A to the B site element B is in the range of about 0.990 to 1.010. Thus, a pure complex oxide powder not containing impurities can be prepared.

The reaction step may be performed under atmospheric pressure. Thus, a desired complex oxide powder can be prepared at a low cost without using special large equipment.

Preferably, the reaction step comprises a substep of applying ultrasonic waves. Preferably, the reaction product has a specific surface area in the range of about 60 to 100 $m^2/g$.

By applying ultrasonic waves, a much finer reaction product having a specific surface area of about 60 to 100 $m^2/g$ can be prepared before calcination.

The method may further include a calcination step of calcining the reaction product.

By calcining the reaction product, an ultrafine, highly crystalline complex oxide powder can be prepared.

The method may further include a dispersion step of dispersing the reaction product in a liquid and a calcination step of calcining the dispersed reaction product.

By dispersing the reaction product in a liquid and then calcining the dispersed product, the crystallographic axial ratio c/a can be further increased.

DESCRIPTION OF THE PREFERRED EMBODIMENTS

In the invention, a hydroxide of an A site element is dissolved in water at a high concentration forming a "fused hydroxide" and the solution is combined with an oxide of a B site element and the reaction allowed to proceed. The water used can be the water of hydration of the hydroxide or an equivalent amount of water when an unhydrated hydroxide is used as a reactant. Because the amount of water generally does not significantly exceed the amount which represents the hydration amount, the A element concentration in the solution is high, e.g., generally about 10 mol % or more. The dissolution generally involves heating at a temperature which does not drive the water out of the system.

The present invention will now be further illustrated with reference to the drawings.

Figure 1:
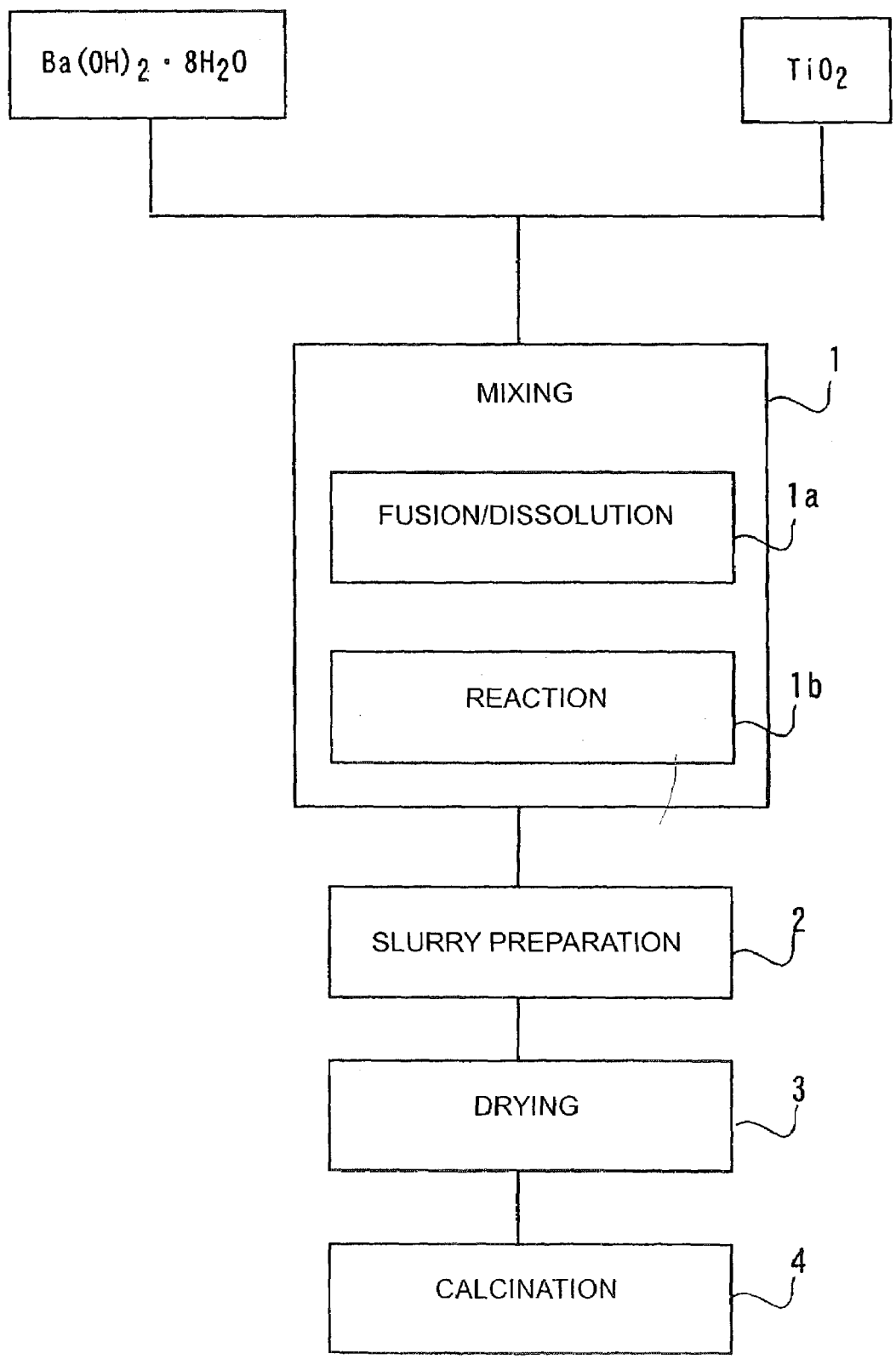
FIG. 1 is a block flow diagram of a method for preparing a complex oxide powder according to an embodiment of the present invention.

FIG. 1 is a block flow diagram showing steps of a method for preparing $BaTiO_3$ powder, according to an embodiment of the present invention.

$Ba(OH)_2 \cdot 8H_2O$ is prepared to act as an hydroxide, containing crystal water, of an element constituting the A site of a perovskite structure expressed by the general formula $ABO_3$. $TiO_2$ powder is also prepared to act as an oxide powder, having a specific surface area Sw of about 250 $m^2$/g or more, of an element constituting the B site of $ABO_3$.

The reason why the $TiO_2$ powder having a specific surface area of about 250 $m^2$/g or more is selected is as follows. If a $TiO_2$ powder having a specific surface area of less than about 250 $m^2$/g is used, heterogeneous phases, such as $Ba_2TiO_4$ and $BaTi_2O_5$, are formed before calcination; hence, cubic crystalline $BaTiO_3$ having high crystallinity cannot be obtained. The final product $BaTiO_3$ powder is also not tetragonal crystalline even after calcination is performed.

Accordingly, the $TiO_2$ powder used in the present invention has a specific surface area of about 250 $m^2$/g or more in order to obtain a tetragonal crystalline $BaTiO_3$ powder with reliability after calcination.

The crystals of $TiO_2$ may have a rutile structure or an anatase structure. However, the rutile structure is likely to allow unreacted $TiO_2$ to remain, and therefore, an anatase-type $TiO_2$ is preferable.

The process of the method will now proceed to a mixing step 1. The mixing step is divided into two steps of a fusion/dissolution step 1a and a reaction step 1b.

In the fusion/dissolution step 1a, $Ba(OH)_2 \cdot 8H_2O$ and $TiO_2$ are weighed such that the mole ratio Ba/Ti of Ba to Ti of $BaTiO_3$ to be synthesized is about 1, and are mixed and heated in a container at a predetermined temperature (for example, at about 60 to 110° C.) to fuse the $Ba(OH)_2 \cdot 8H_2O$.

Since $Ba(OH)_2 \cdot 8H_2O$ contains crystal water (octahydrate), the fusion of $Ba(OH)_2 \cdot 8H_2O$ means that the $Ba(OH)_2$ is dissolved in the crystal water to yield a Ba solution containing a high concentration of activated $Ba^{2+}$. In the reaction step 1b, the Ba solution is allowed to react with the $TiO_2$ under atmospheric pressure, and thus a reaction product, or $BaTiO_3$, is produced in a slurry form after a predetermined period of time (for example, after about an hour).

In other words, the fusion/dissolution step 1a and the reaction step 1b proceed consecutively to produce a $BaTiO_3$ slurry from the $Ba(OH)_2 \cdot 8H_2O$ and the $TiO_2$, as shown in formula (1):

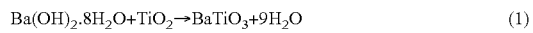

$$Ba(OH)_2 \cdot 8H_2O + TiO_2 \rightarrow BaTiO_3 + 9H_2O \quad (1)$$

Figure 2:
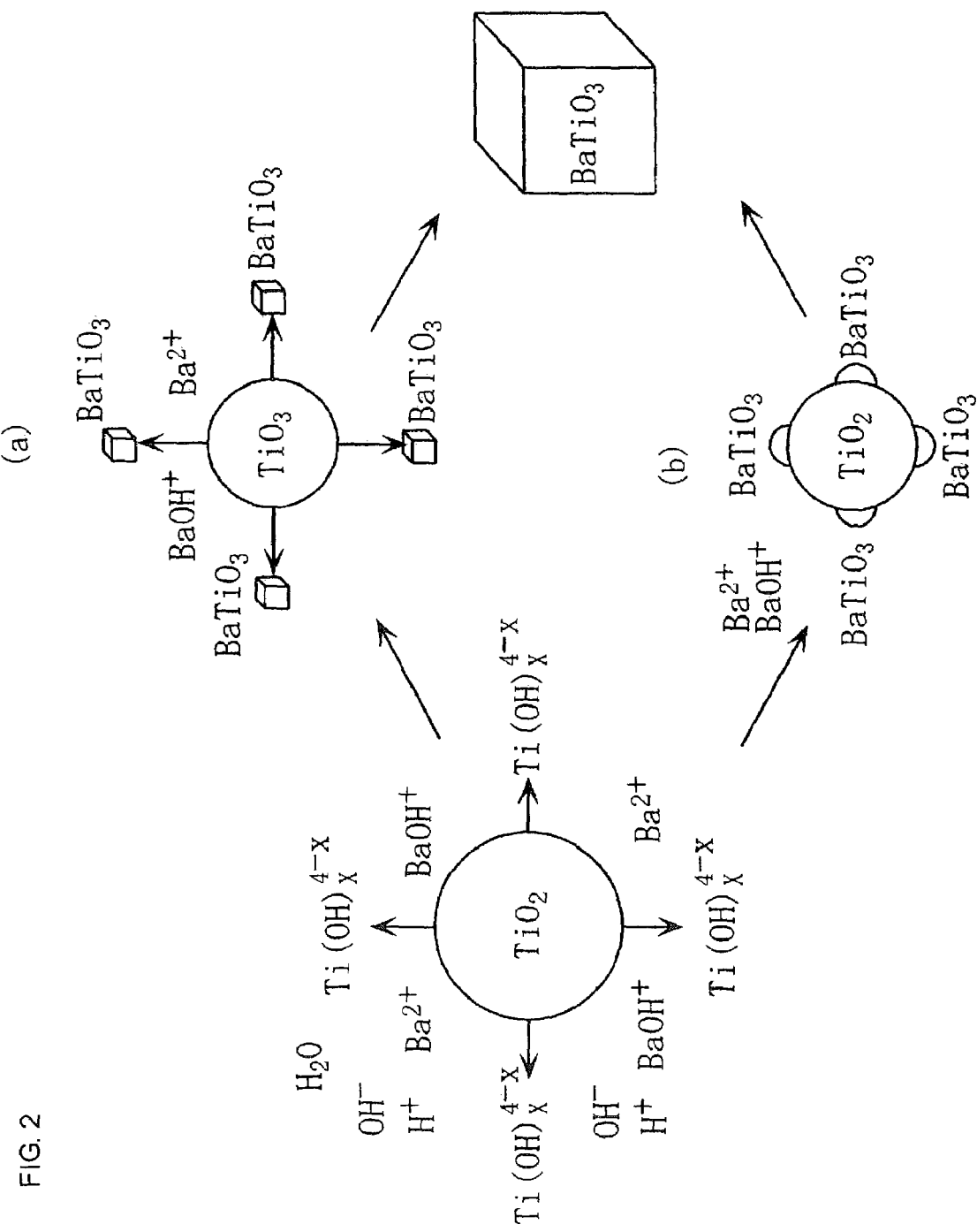
FIG. 2 is an illustration showing a reaction path of $BaTiO_3$ synthesis of the present invention.
Figure 3:
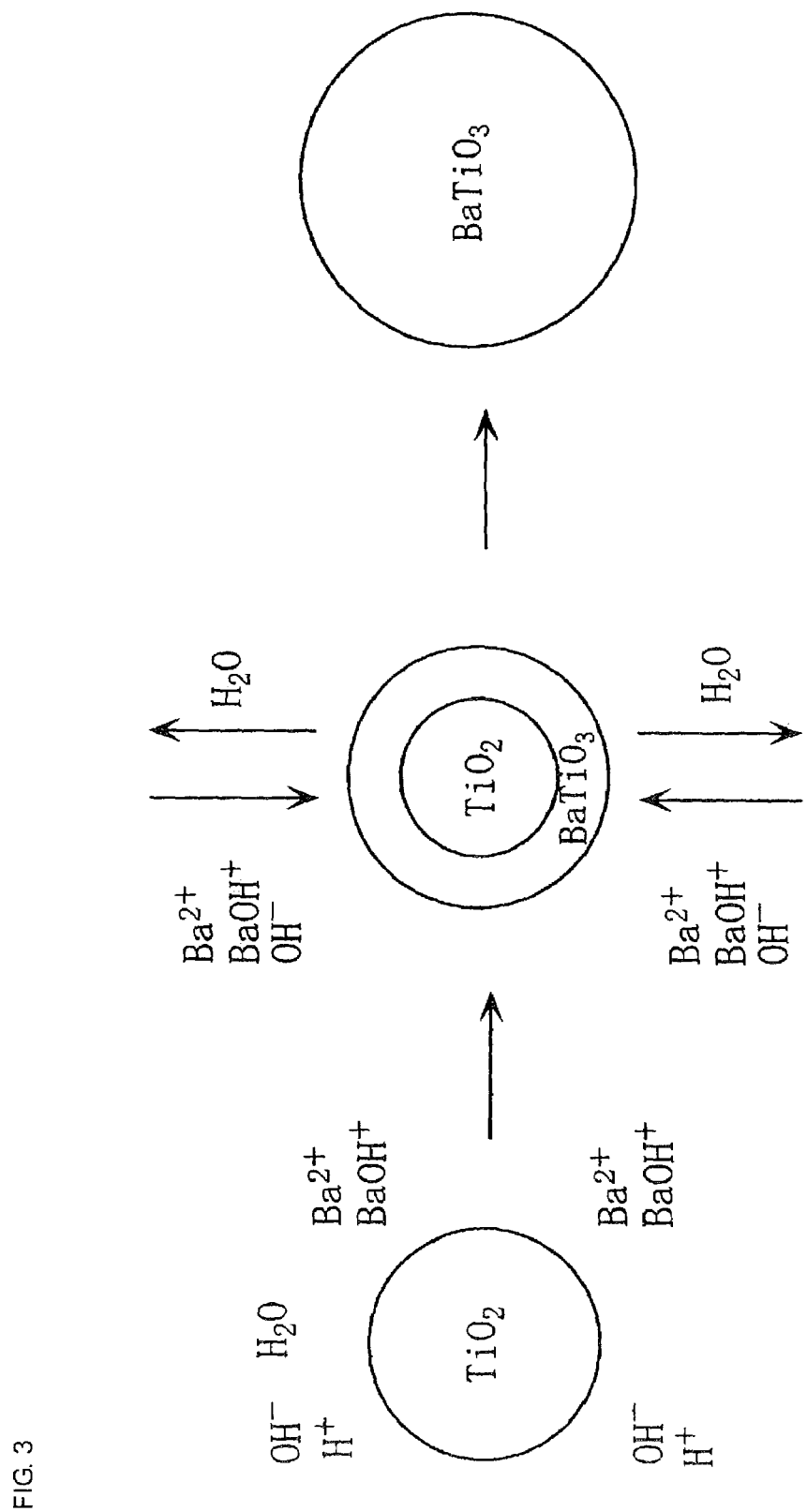
FIG. 3 is an illustration showing another reaction path of $BaTiO_3$ synthesis of the present invention.

It is known that $BaTiO_3$ is synthesized through the two reaction paths (1) and (2) shown in FIGS. 2 and 3 (J. O. Eckert Jr, et al., J. Am. Ceram. Soc., 79[11], 2929-39, (1996)).

In reaction path (1), a homogeneous nucleation (a) and a heterogeneous nucleation (b) proceed in parallel to produce $BaTiO_3$ when $TiO_2$ is dissolved in the Ba solution. In reaction path (2), Ba is diffuses among $TiO_2$ particles to produce $BaTiO_3$.

Since the solubility of $TiO_2$ is low and the degree of critical saturation of $BaTiO_3$ is high, the growth of $BaTiO_3$ particles becomes extremely slow after the nucleation of $BaTiO_3$. It is therefore considered that reaction path (1) is predominant to reaction path (2) in an early stage of the reaction, and that reaction path (2) becomes predominant in a later stage.

However, the $TiO_2$ powder has a large specific surface area Sw of about 250 $m^2$/g or more, in the method of the present invention so that it can be rapidly dissolved. As a result, a precipitate serving as seed crystals for particle growth is sufficiently supplied and, thus, reaction path (1) substantially completes the synthesis.

A larger specific surface area of $TiO_2$ helps the $TiO_2$ dissolve; hence, as the specific surface of $TiO_2$ becomes larger, reaction path (1) is more rapidly completed to produce $BaTiO_3$. The specific surface area of $TiO_2$ is, therefore, 250 $m^2$/g or more and there is no upper limit.

In a slurry preparation step 2, the $BaTiO_3$ reaction product is placed in a sand mill containing pulverizing media, and is pulverized with heating at the above-described predetermined temperature (for example, at about 60 to 110° C.) to prepare a slurry. The slurry is then recovered.

Then, the slurry was dried in a drying step 3, at a predetermined temperature (for example, at 200° C.) in an oven to prepare a $BaTiO_3$ powder having an equivalent specific surface diameter of about 20 nm.

In a following calcination step 4, the resulting $BaTiO_3$ powder is calcined at a temperature of about 900 to 1000° C. for about 2 hours so that the particles grow to an equivalent specific surface diameter of about 100 to 350 nm. Thus, the crystal system changes to a tetragonal crystal system to yield a highly pure, ultrafine $BaTiO_3$ powder.

The resulting $BaTiO_3$ powder has tetragonal crystals having a crystallographic axial ratio c/a of the c axis to the a axis in the range of about 1.0068 to 1.0092; hence the $BaTiO_3$ powder does not include heterogeneous phases and is highly crystalline.

The mole ratio Ba/Ti of Ba constituting A site to Ti constituting the B site is about 0.990 to 1.010 in the $BaTiO_3$ powder; hence, the $BaTiO_3$ powder is highly pure.

In this embodiment, by preparing a high concentration of activated Ba solution, a sufficiently high concentration of hydroxide ions can be obtained. It is therefore not necessary to add an alkali metal element to prepare $BaTiO_3$ powder.

The method of the invention does not need to use a hazardous alkoxide or excessive alkali, nor thus, need explosion proof equipment such as that required in the alkoxide-hydroxide route. Also, since the reaction step can be performed at a low temperature of about 60 to 110° C. under atmospheric pressure, the manufacturing cost is reduced, without the necessity of pressure resistant equipment required in hydrothermal synthesis.

By allowing $Ba(OH)_2 \cdot 8H_2O$ to react with ultrafine $TiO_2$ powder while being heated, an ultrafine $BaTiO_3$ powder containing no heterogeneous phase and having high crystallinity can be prepared at a low cost.

In addition, the steps of this embodiment are simple, and it is therefore easy to increases manufacturing efficiency by conducting the steps successively. The method of the present invention makes it possible to mass-produce a high quality $BaTiO_3$ powder at a low cost.

The method of the present invention is not limited to the above-described embodiment. In the above embodiment, $Ba(OH)_2 \cdot 8H_2O$ is fused and dissolved by heating to prepare a solution of a high concentration of Ba. However, barium hydroxide anhydride ($Ba(OH)_2$) may be mixed with water in an amount equivalent to the amount of the crystal water contained in $Ba(OH)_2 \cdot 8H_2O$ to prepare the solution of a high concentration of Ba. Thus, a fine $BaTiO_3$ powder having high crystallinity may be prepared, as in the earlier described embodiment.

Here, the $BaTiO_3$ reaction product is yielded in a slurry form by the reaction of the Ba solution with the $TiO_2$ in the reaction step 1b. The reaction product $BaTiO_3$ may be further exposed to ultrasonic waves having a frequency of about 10 to 30 kHz while being stirred. By applying the ultrasonic waves, much finer cubic crystalline $BaTiO_3$ having a specific surface area Sw of about 60 to 100 $m^2/g$ and containing no heterogeneous phase can be prepared before calcination.

The foregoing has described a method applied to the preparation of $BaTiO_3$ powder in detail. However, the method can be applied to the preparation of other complex oxides having a perovskite structure, such as $SrTiO_3$ and $(Ba, Ca)TiO_3$.

EXAMPLES

Examples of the present invention will now be described.

Experiment 1

The inventors first investigated the reaction path of $BaTiO_3$ synthesis.

Anatase-type $TiO_2$ having a specific surface area Sw of 330 $m^2/g$ and $Ba(OH)_2 \cdot 8H_2O$ were weighed such that the mole ratio of Ba to Ti in the $BaTiO_3$ to be synthesized is 1. Specifically, 57.342 g of $TiO_2$ and 202.88 g of $Ba(OH)_2 \cdot 8H_2O$ were weighed. They were placed in a container heated to 70° C. and allowed to react, and the process of $BaTiO_3$ production was observed.

Figure 4:
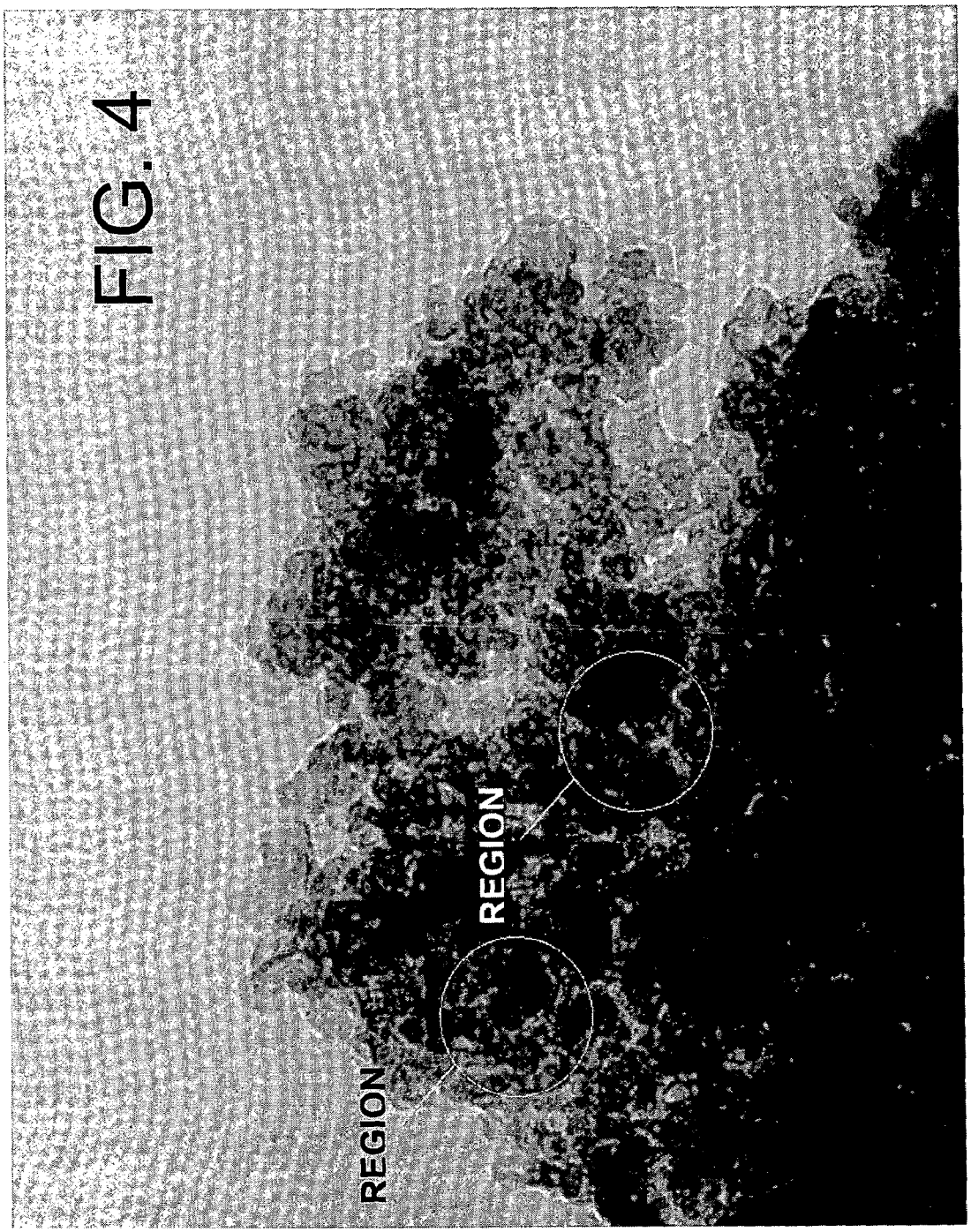
FIG. 4 is a transmission electron micrograph of crystals after 5 minutes have elapsed from the start of a reaction in a reaction step of synthesizing $BaTiO_3$.
Figure 5:
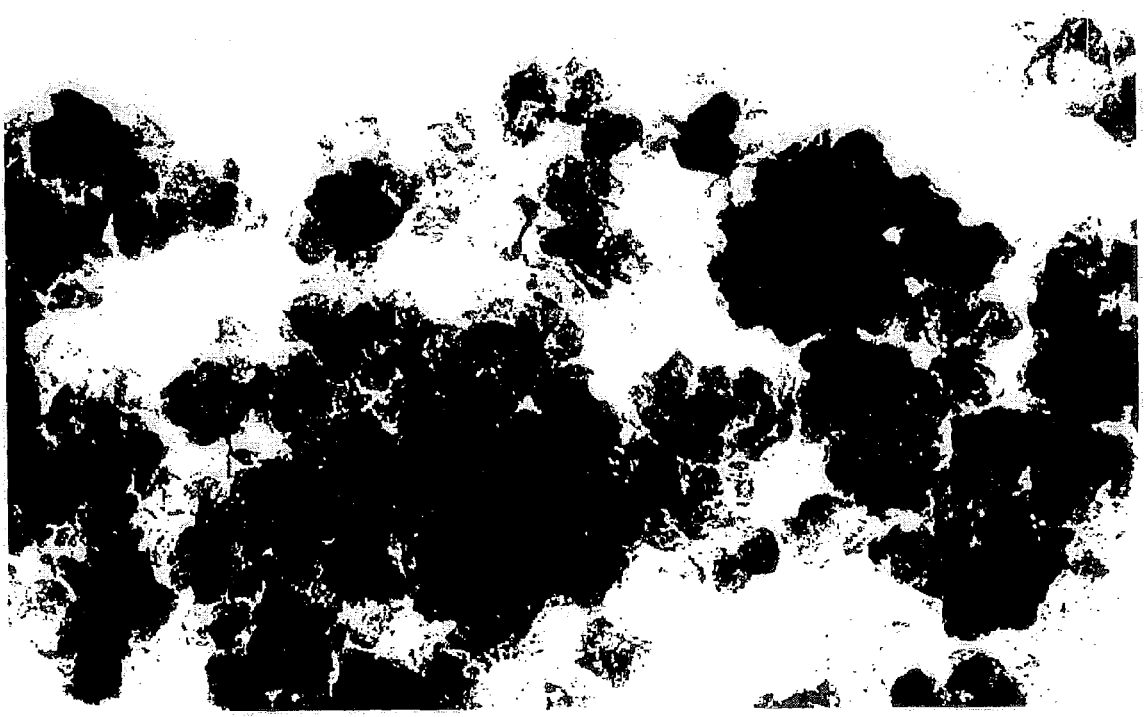
FIG. 5 is a transmission electron micrograph of crystals after 30 minutes have elapsed from the start of the reaction in the reaction step of synthesizing $BaTiO_3$.
Figure 6:
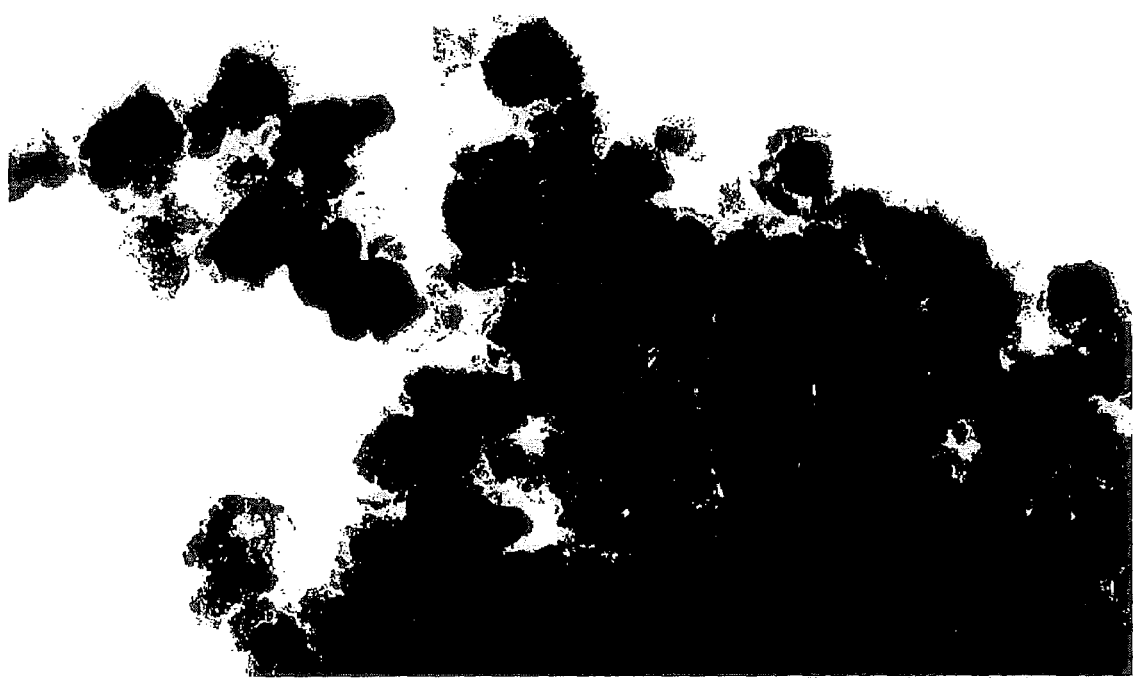
FIG. 6 is a transmission electron micrograph of crystals after 60 minutes have elapsed from the start of the reaction in the reaction step of synthesizing $BaTiO_3$.
Figure 7:
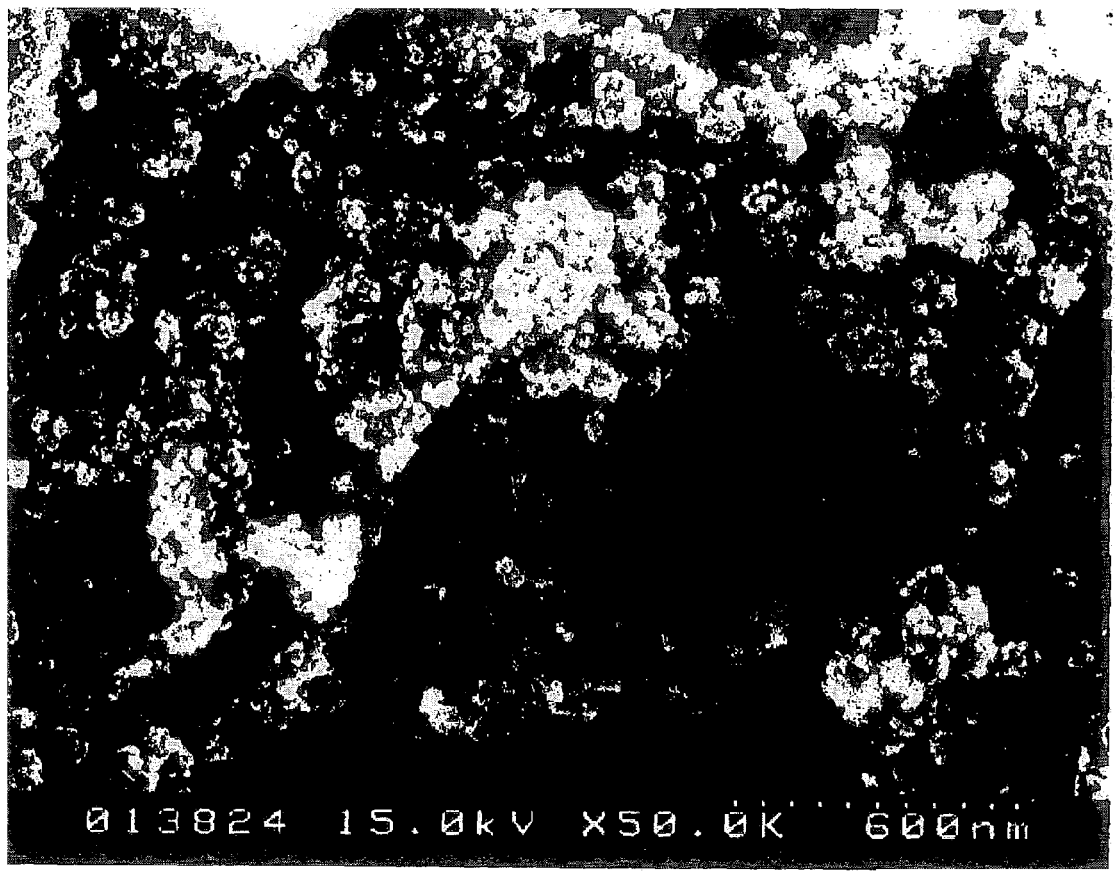
FIG. 7 is a scanning electron micrograph of non-calcined $BaTiO_3$ (dried at 200° C.)
Figure 8:
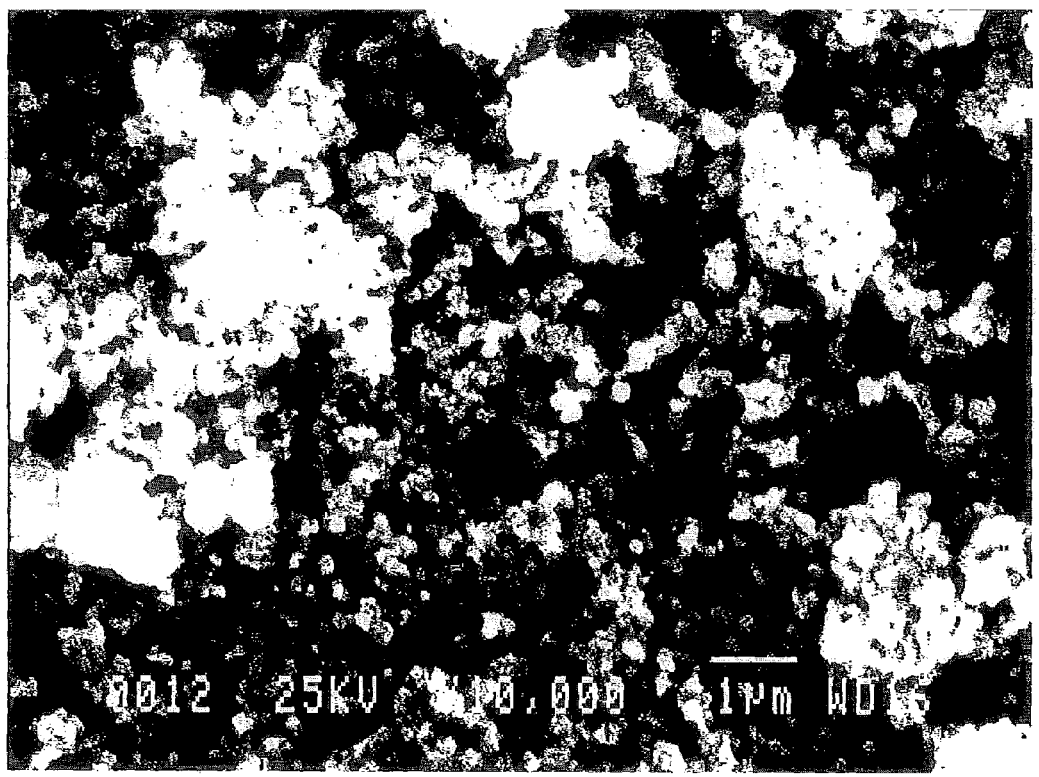
FIG. 8 is a scanning electron micrograph of $BaTiO_3$ calcined at 900° C.
Figure 9:
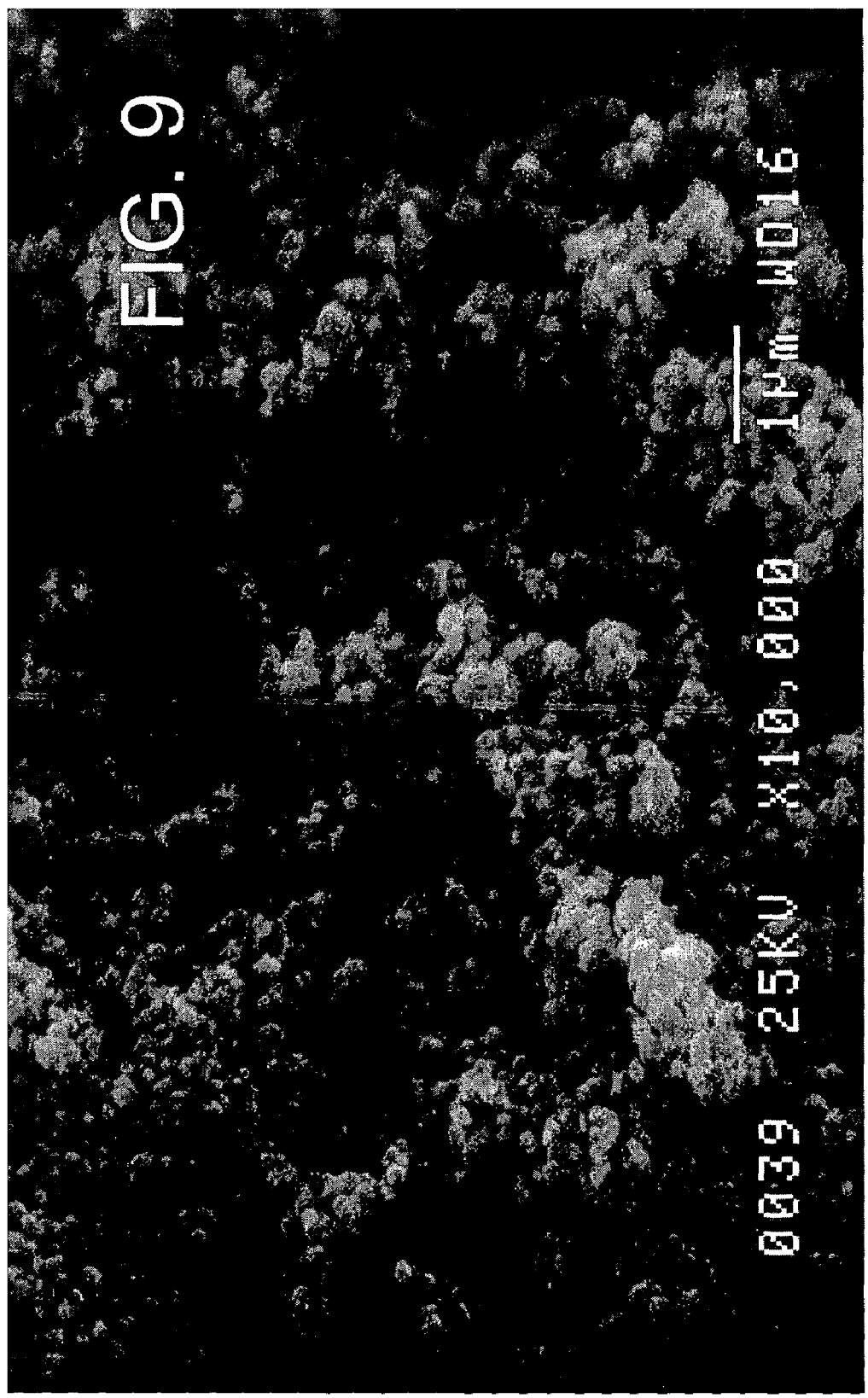
FIG. 9 is a scanning electron micrograph of $BaTiO_3$ calcined at 950° C.
Figure 10:
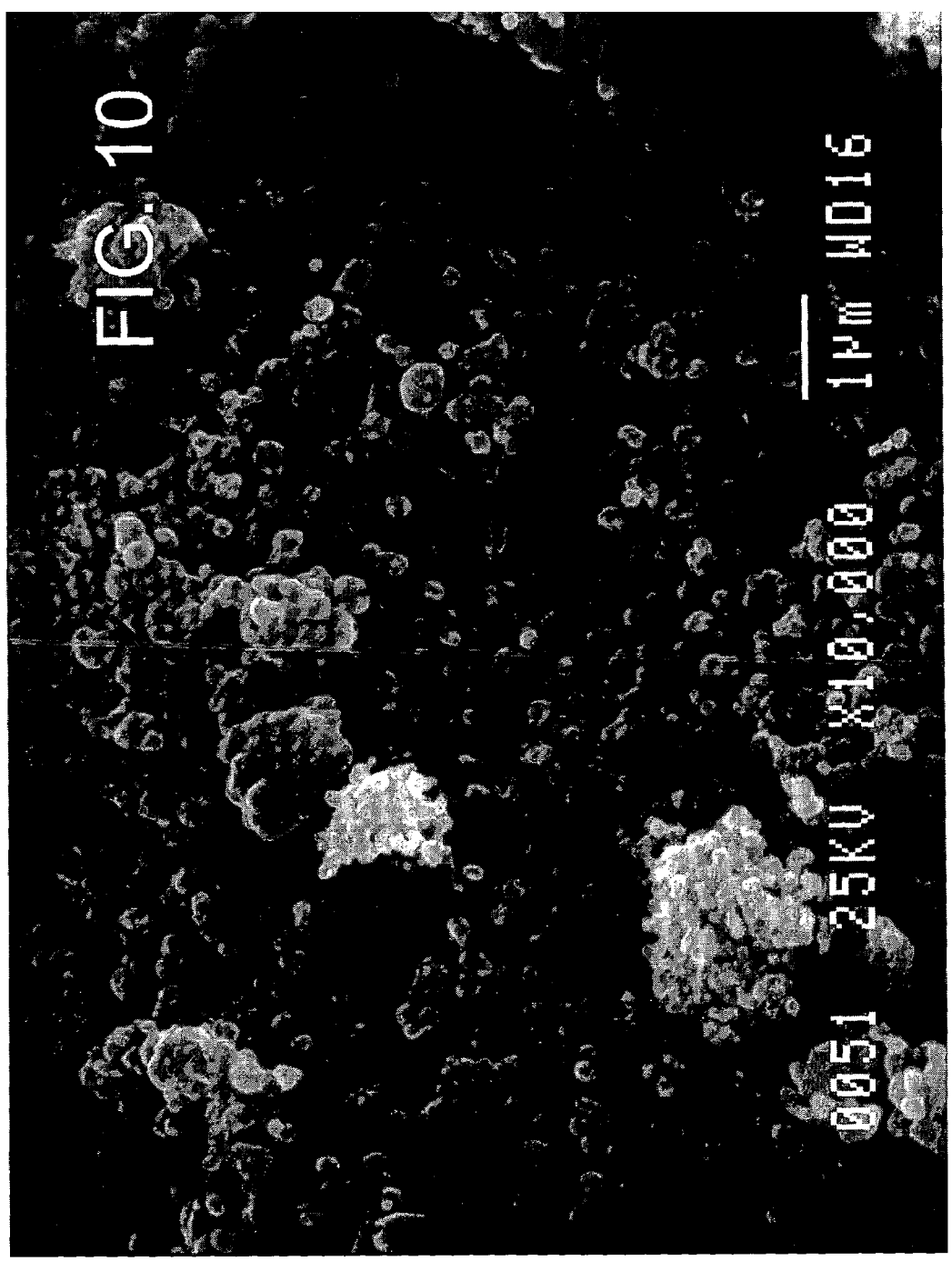
FIG. 10 is a scanning electron micrograph of $BaTiO_3$ calcined at 1000° C.

FIGS. 4 to 6 are transmission electron micrographs of crystals in the process of $BaTiO_3$ synthesis.

FIG. 4 shows crystals after 5 minutes have elapsed from the start of the reaction, taken at a magnification of 790,000 times by transmission electron microscopy (TEM). FIGS. 5 and 6 show crystals in the region surrounded by the circle shown in FIG. 4 after 30 and 60 minutes have elapsed from the start of the reaction, taken at a magnification of 390,000 times by TEM.

FIGS. 4 to 6 suggest that $TiO_2$ powder initially having a particle size of about 5 nm grows to $BaTiO_3$ having a particle size of about 20 nm while the reaction proceeds.

The mole ratio Ba/Ti was measured by energy dispersive X-ray spectroscopy (EDX). As a result, the mole ratio Ba/Ti was 6/29 after 5 minutes had elapsed from the start of the reaction (FIG. 4), and it changed to 19/20 after 30 minutes had elapsed from the start of the reaction (FIG. 5), showing that the Ba and Ti molar contents were substantially the same.

The reaction generally proceeds through the two reaction paths shown in FIG. 2 (reaction path 1) and FIG. 3 (reaction path 2). However, the particles in the series of the reaction shown in FIGS. 4 to 6 in this example were single crystals and did not exhibit diffusion of part of the Ba. Therefore, it is concluded that the reaction proceeded through reaction path (1).

Experiment 2

A $BaTiO_3$ reaction product prepared as in Example 1 was placed in a desk-top sand mill with 800 g of partially stabilized zirconia (PSZ) of 1 mm in diameter serving as pulverizing media, and was agitated and pulverized at 70° C. for 1 hour at a rotation speed of 9 $s^{-1}$ (540 rpm) to prepare a slurry. The slurry taken out from the mill was dried at 200° C. in an oven to form a solid. The solid was divided into three portions, and each solid was calcined at 900, 950 or 1000° C. to yield $BaTiO_3$ powder of Example 1. The mole ratio Ba/Ti of Ba to Ti of the resulting $BaTiO_3$ powder was 0.998, according to X-ray fluorescence analysis (XRF).

The specific surface areas Sw of the $BaTiO_3$ powders of Example 1, prepared at different calcination temperatures, were measured by the Brunauer-Emmett-Teller (BET) method and the equivalent specific surface diameters D were derived from the specific surface areas. The powders of Example 1 were subjected to powder X-ray diffraction (XRD), and the axial ratio c/a of the c axis to the a axis of the crystals was calculated based on the XRD results. For the sake of comparison, non-calcined powder dried at 200° C. was also subjected to the same measurement.

Table 1 shows the results.

TABLE 1

| Calcination Temperature (° C.) | Mole ratio A site/B site | Axial ratio c/a | Specific surface area Sw ($m^2/g$) | Equivalent specific surface diameter D (nm) |
|---|---|---|---|---|
| non-calcined (dried at 200° C.) | 0.998 | 1.0000 | 47.61 | 21.0 |
| 900 | 0.998 | 1.0075 | 7.31 | 137 |
| 950 | 0.998 | 1.0082 | 5.69 | 176 |
| 1000 | 0.998 | 1.0088 | 3.88 | 258 |

As shown in Table 1, the non-calcined powder exhibited a specific surface area Sw of 47.61 $m^2/g$, a small equivalent specific surface diameter D of 21.0 nm, and a axial ratio c/a of 1.000, indicating a cubic system.

Table 1 also suggests that the particle size is increased by calcination and that, as the particle size becomes larger, the axial ratio c/a increases so that the crystal system changes from a cubic system to a tetragonal system.

FIGS. 7 to 10 are scanning electron micrographs of the non-calcined powder and powders of Example 1 calcined at 900, 950 or 100°C. They show that, as the calcination temperature becomes higher, the particles grow to be larger.

Figure 11:
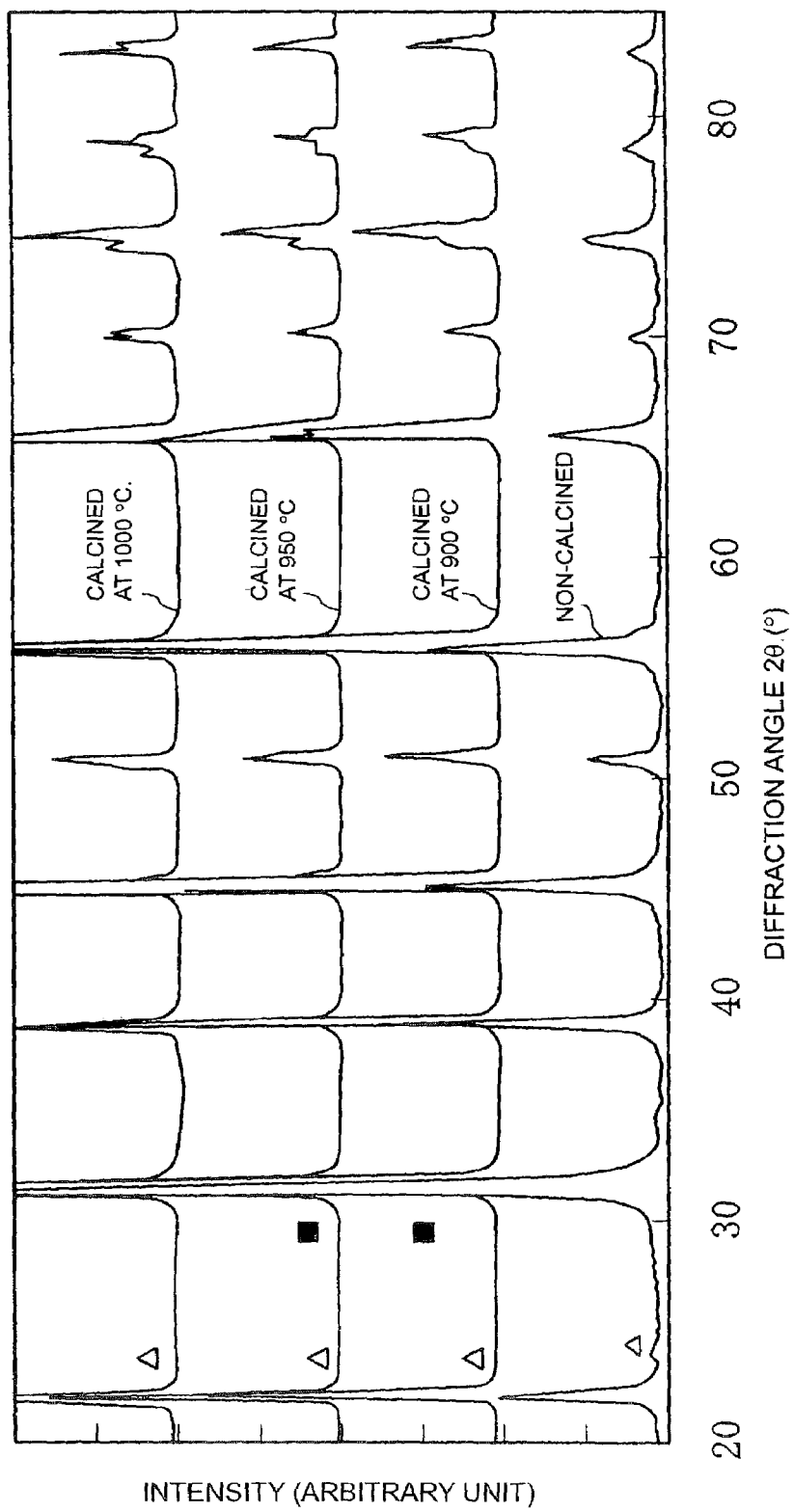
FIG. 11 is an X-ray diffraction diagram resulting from Experiment 2.

FIG. 11 shows the results of XRD. The horizontal axis represents the diffraction angle 2θ and the vertical axis represents intensity (arbitrary unit). In FIG. 11, the white triangles represent $BaCO_3$ which could be by-produced in the reaction, and the black squares represent $Ba_2TiO_4$ having a Ba content higher than that of $BaTiO_3$.

As shown in FIG. 11, even the non-calcined powder exhibits a peak of cubic crystalline $BaTiO_3$. It is therefore shown that cubic crystalline BaTiO3 having high crystallinity can be produced even by synthesis at a low temperature of 70° C., and that heterogeneous phases, such as $BaCO_3$ and $Ba_2TiO_4$, are hardly by-produced.

Thus, ultrafine, cubic crystalline $BaTiO_3$ having high crystallinity can be produced before calcination, as distinct from the known methods such as the pulverization method. Therefore, ultrafine, tetragonal crystalline $BaTiO_3$ powder can be obtained by calcination.

$BaTiO_3$ powders of Comparative Examples 1 and 2 were prepared by the hydrothermal synthesis and the alkoxide-hydroxide route, respectively. The relationship between the particle size and the axial ratio c/a of the $BaTiO_3$ powders of Example 1 and Comparative Examples 1 and 2 were investigated.

The BaTiO$_3$ powder of Comparative Example 1 was prepared by the following procedure.

In 10 mL of water, 0.01 mol of NaOH was dissolved to prepare a NaOH solution, and 2.5 mL of BaCl$_2$ or Ba(OH)$_2$ and 2.5 mL of TiO$_2$ were added to the NaOH solution. The mixture was heated in an autoclave to react under conditions of a high temperature of 250° C. and a high pressure of 5 MPa. The resulting precipitate was filtered and washed with water.

The reaction product was subjected to XRD and unreacted TiO$_2$ and BaCO$_3$ were not detected.

The reaction product was allowed to react with BaCl$_2$ for one week to prepare a tetragonal crystalline BaTiO$_3$ having a particle size of 50 nm. Then, the BaTiO$_3$ was divided into three portions, and each was calcined at 900, 950 or 1000° C. to yield a BaTiO$_3$ powder of Comparative Example 1.

The BaTiO$_3$ powder of Comparative Example 2 was prepared by the following procedure.

Into a solution of $2.5 \times 10^3$ mol/m$^3$ titanium isopropoxide (Ti[OCH(CH$_3$)$_2$]$_4$) maintained at a temperature of 60° C., Ba(OH)$_2$.8H$_2$O powder was added such that the mole ratio Ba/Ti of Ba to Ti of BaTiO$_3$ to be synthesized is 1, and was strongly stirred. After the Ba(OH)$_2$ was uniformly dissolved and then 3 minutes elapsed, the solution became clouded and gelled. The resulting gelled slurry was subjected to infrared spectroscopy. As a result, absorption bands were observed at 380 cm$^{-1}$ and 570 cm$^{-1}$; hence, it was shown that a substance having a perovskite structure was present in the gelled slurry.

The gelled slurry was dried in an oven heated to 150° C. for 2 hours to yield a BaTiO$_3$ powder having a particle size of 48 nm. This BaTiO$_3$ powder had a mole ratio Ba/Ti of 0.998 and a specific surface area Sw of 45 m$^2$/g, according to XRF. The BaTiO$_3$ powder was divided into three parts, and each was calcined at 900, 950 or 1000° C. to yield BaTiO$_3$ powder of Comparative Example 2.

Figure 12:
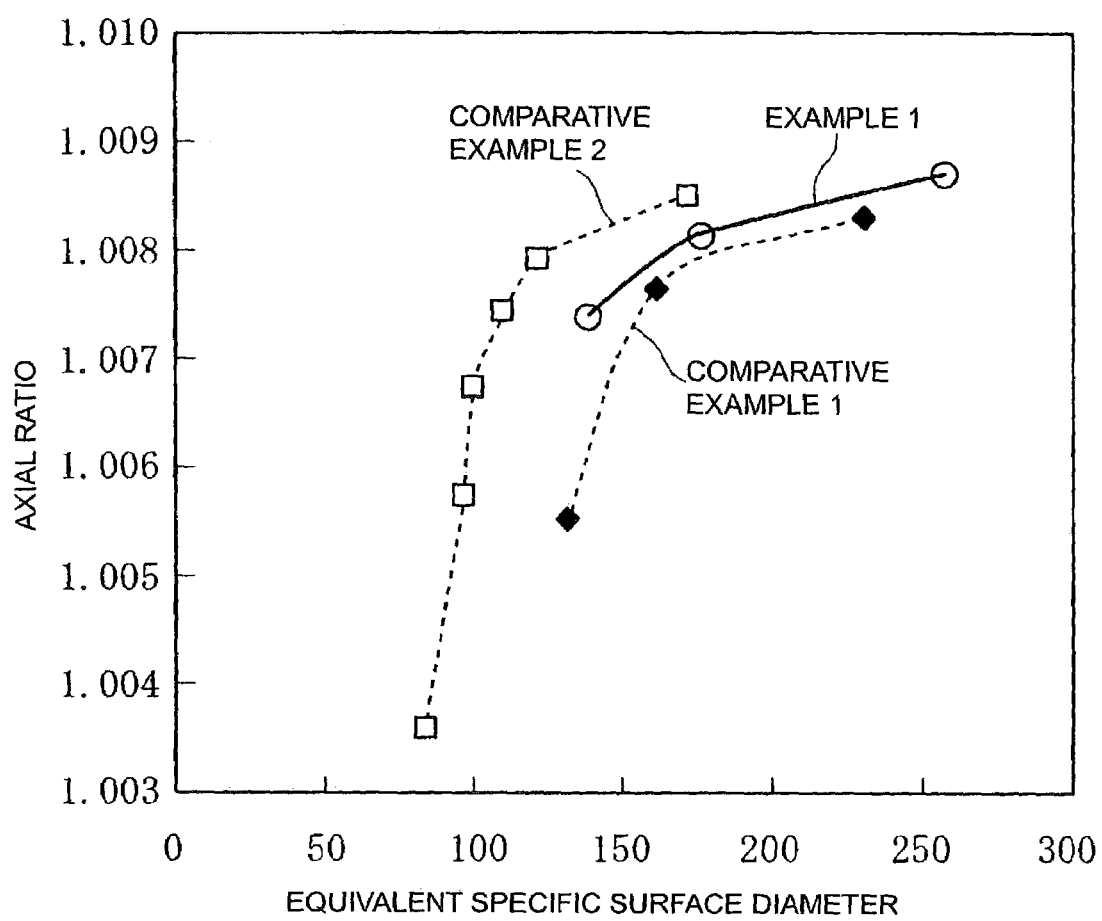
FIG. 12 is a graph showing the relationships between the particle size and the axial ratio c/a of $BaTiO_3$ powders of an Example and a comparative example.

FIG. 12 shows the relationship between the particle size and the axial ratio of the calcined BaTiO$_3$ of Example 1 and Comparative Examples 1 and 2. The white circles, black rhombus, and white squares shown in FIG. 12 represent Example 1, Comparative Example 1 and Comparative Example 2, respectively.

FIG. 12 shows that BaTiO$_3$ of Example 1 has an larger axial ratio c/a and a smaller particle size than those of Comparative Example 1, a cubic system having high crystallinity.

The BaTiO$_3$ of Comparative Example 2 by the alkoxide-hydroxide route had crystallinity higher than that of Example 1. However, the alkoxide-hydroxide route needs a molar amount of Ba(OH)$_2$ which was 2 to 3 times larger than that of TiO$_2$, and thus needs such an excessive amount of Ba(OH)$_2$.

In contrast, the molar amounts of TiO$_2$ and Ba(OH)$_2$ used in Example 1 are substantially the same. It is not necessary to use an excessive amount of Ba(OH)$_2$, and therefore Ba$^{2+}$ does not remain in the solution after the synthesis. Thus, it is easy to control the composition of BaTiO$_3$ and to reduce manufacturing costs.

Experiment 3

BaTiO$_3$ powders were prepared using TiO$_2$ powders having different specific surface areas Sw according to the following procedure, and subjected to XRD to investigate whether a heterogeneous phase was present.

Anatase-type TiO$_2$ powder having a specific surface area of 250 m$^2$/g in an amount of 62.410 g and Ba(OH)$_2$.8H$_2$O in an amount of 119.77 g were weighed so that the mole ratio Ba/Ti of Ba to Ti of BaTiO$_3$ to be synthesized would be 1.

The weighed materials were placed in a desk-top sand mill with 800 g of PSZ of 1 mm in diameter and agitated and pulverized at 70° C. for 1 hour at a rotation speed of 9 s$^{-1}$ (540 rpm) to prepare a slurry, as in Experiment 2. The slurry taken out from the mill was dried at 200° C. in an oven to yield BaTiO$_3$ of Example 11 in a solid form.

In the same manner, anatase-type TiO$_2$ powder having a specific surface area of 300 m$^2$/g in an amount of 189.28 g and Ba(OH)$_2$.8H$_2$O in an amount of 56.898 g were weighed so that the mole ratio Ba/Ti of Ba to Ti of BaTiO$_3$ to be synthesized would be 1. Thus, BaTiO$_3$ of Example 12 was prepared in a solid form, as in Example 11.

In the same manner, anatase-type TiO$_2$ powder having a specific surface area of 330 m$^2$/g in an amount of 202.01 g and Ba(OH)$_2$.8H$_2$O in an amount of 56.898 g were weighed so that the mole ratio Ba/Ti of Ba to Ti of BaTiO$_3$ to be synthesized would be 1. Thus, BaTiO$_3$ of Example 13 was prepared in a solid form, as in Example 11.

Furthermore, in the same manner, anatase-type TiO$_2$ powder having a specific surface area of 240 m$^2$/g in an amount of 75.721 g and Ba(OH)$_2$.8H$_2$O in an amount of 270.51 g were weighed so that the mole ratio Ba/Ti of Ba to Ti of BaTiO$_3$ to be synthesized would be 1. Thus, BaTiO$_3$ of Comparative Example 11 was prepared in a solid form, as in Example 11.

The BaTiO$_3$ of Examples 11 to 13 and Comparative Example 11 were subjected to XRD.

Figure 13:
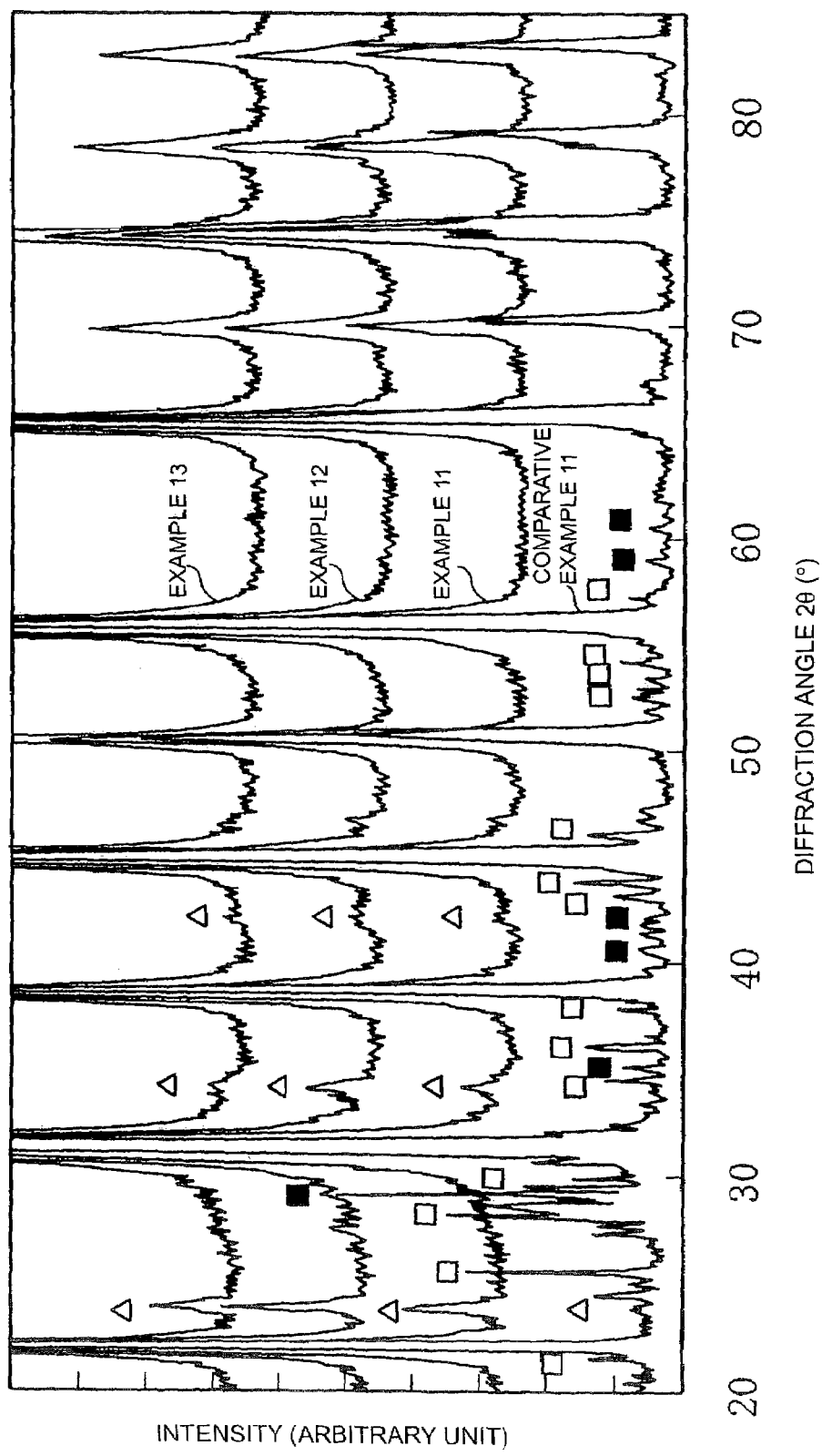
FIG. 13 is an X-ray diffraction diagram resulting from Experiment 3.

FIG. 13 shows the results of XRD. The horizontal axis represents the diffraction angle 2θ and the vertical axis represents intensity (arbitrary unit). The white triangles, black squares and white squares represent heterogeneous phases of BaCO$_3$, Ba$_2$TiO$_4$ and BaTi$_2$O$_5$, respectively. For example, Comparative Example 11 exhibits two sharp peaks at diffraction angles 2θ of 25° and 28° with white squares thereabove, which show the formation of heterogeneous phases of BaTi$_2$O$_5$. Comparative Example 11 also exhibits a sharp peak at a diffraction angle 2θ of 29° with a black square thereabove, which shows the formation of a heterogeneous phase of Ba$_2$TiO$_4$.

As shown in FIG. 13, while the BaTiO$_3$ of Example 11 (specific surface area Sw: 240 m$^2$/g) includes heterogeneous phases of BaCO$_3$, BaTi$_2$O$_5$ and Ba$_2$TiO$_4$ between a wide rage of diffraction angles 2θ of 20° to 60°, the Examples 11 to 13 (specific surface areas Sw: 250 to 330 m$^2$/g) include few heterogeneous phases of BaCO$_3$ and no BaTi$_2$O$_5$ or Ba$_2$TiO$_4$. Thus, it is shown that TiO$_2$ powder must have a specific surface area of at least about 250 m$^2$/g.

Experiment 4

The BaTiO$_3$ reaction product slurry was exposed to ultrasonic waves, and properties of the resulting powder was investigated.

First, 150 mL of water was placed in a vessel heated by circulating vapor of 100° C. to prepare hot water of 60° C. Anatase-type TiO$_2$ having a specific surface area of 300 m$^2$/g in an amount of 98.067 g and Ba(OH)$_2$ in an amount of 185.318 g were weighed so that the mole ratio Bi/Ti of Ba to Ti of BaTiO$_3$ to be synthesized would be 1.003, and were then added to the hot water. The Ba(OH)$_2$ was allowed to start reacting, with heat generated, to prepare BaTiO$_3$ in a slurry form.

The BaTiO$_3$ was stirred with a magnetic stirrer while being exposed to ultrasonic waves having a frequency of 16 kHz by immersing in the horn of an ultrasonic emitter.

Then, the BaTiO$_3$ was pulverized with a desk-top sand mill, in substantially the same manner as Experiment 2, to prepare a slurry. The slurry was taken out of the mill and placed in an oven heated to 200° C. to dry. Thus, a non-calcined solid BaTiO$_3$ was prepared.

The mole ratio Ba/Ti of Ba to Ti of the resulting non-calcined BaTiO$_3$ was 0.9998, according to XRF analysis.

The non-calcined $BaTiO_3$ was subjected to XRD to investigate whether a heterogeneous phase was present.

Figure 14:
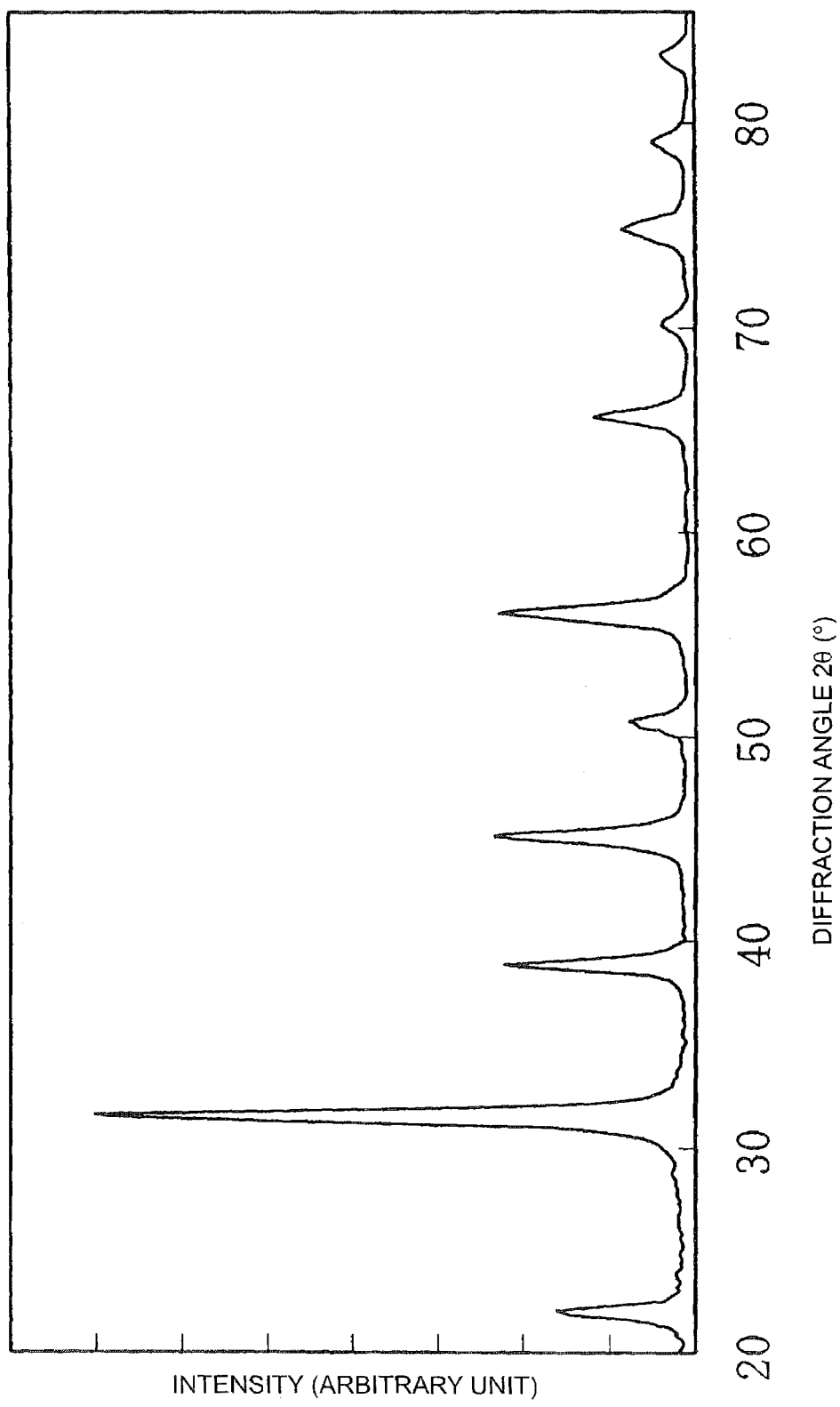
FIG. 14 is an X-ray diffraction diagram resulting from Experiment 4.

FIG. 14 shows the results of XRD. The horizontal axis represents the diffraction angle 2θ and the vertical axis represents intensity (arbitrary unit).

As shown FIG. 14, the non-calcined $BaTiO_3$ does not include any heterogeneous phases such as $Ba_2TiO_4$, and it is therefore shown that a pure, solid $BaTiO_3$ can be prepared before calcination.

The axial ratio c/a of the non-calcined solid $BaTiO_3$ was calculated from the results of XRD, as in Experiment 2. Also, the specific surface area Sw of the $BaTiO_3$ was measured by the BET method and the equivalent specific surface diameter D was derived from the specific surface area Sw.

Table 2 shows the results.

TABLE 2

| | Mole ratio A site/B site | Axial ratio c/a | Specific surface area Sw (m²/g) | Equivalent specific surface diameter D (nm) |
|---|---|---|---|---|
| $BaTiO_3$ dried at 200° C. | 0.9998 | 1.0000 | 64.08 | 15.6 |

Table 2 shows that the non-calcined $BaTiO_3$ dried at 200° C. after exposure of ultrasonic waves has a specific surface area Sw of 64.08 m²/g and an equivalent specific surface diameter D of 15.6 nm, smaller than that of the non-calcined $BaTiO_3$ in Experiment 2, shown in Table 1. It is therefore shown that the exposure to ultrasonic waves contributes to the reduction of the particle size of $BaTiO_3$. Also, the axial ratio c/a is 1.000, showing a cubic system.

Experiment 5

A $BaTiO_3$ dried in an oven heated to 200° C., as in Experiment 2, was placed in a ball mill with isopropyl alcohol, and was wet-pulverized for 10 hours to be dispersed in the isopropyl alcohol. The dispersed $BaTiO_3$ was dried at 200° C. in an oven to form a solid. The solid was divided into three portions, and each solid was calcined at 900, 950 or 1000° C. for 2 hours to yield a calcined $BaTiO_3$ powder.

The axial ratio c/a, the specific surface area Sw, and the equivalent specific surface diameter D of the resulting calcined $BaTiO_3$ powders and the non-calcined $BaTiO_3$ at dried at 200° C. were measured.

Table 3 shows the results.

TABLE 3

| Calcination Temperature (° C.) | Mole ratio A site/B site | Axial ratio c/a | specific surface area Sw (m²/g) | Equivalent specific surface diameter D (nm) |
|---|---|---|---|---|
| non-calcined (dried at 200° C.) | 0.998 | 1.0000 | 55.2 | 18.1 |
| 900 | 0.998 | 1.0080 | 7.53 | 133 |
| 950 | 0.998 | 1.0092 | 4.90 | 204 |
| 1000 | 0.998 | 1.0098 | 3.25 | 308 |

Table 3 shows that by calcining at a temperature of 950° C. or more, the specific Sw is reduced, but the axial ratio c/a can be increased in comparison with experiment 2, shown in Table 1, in which the dispersion step was not performed.

What is claimed is:

1. A method for preparing a complex oxide powder having a perovskite structure expressed by the general formula $ABO_3$, the method comprising dissolving and heating a hydroxide of an element constituting the A site of the general formula $ABO_3$ in water to form a fused hydroxide, the water consisting of crystal water contained in the hydroxide of the element constituting the A site of the general formula $ABO_3$;

reacting the fused hydroxide with an oxide powder of an element constituting the B site of the general formula $ABO_3$, the B site oxide powder being particles having a specific surface area of about 250 m²/g or more, to form a reaction product comprising the complex oxide powder in the form of ultrafine particles; and calcining the reaction product.

2. A method for preparing a complex oxide powder according to claim 1, wherein the hydroxide is barium hydroxide octahydrate and the oxide powder of the B site element is titanium oxide powder.

3. A method for preparing a complex oxide powder according to claim 2, wherein the reaction further comprises ultrasonication.

4. A method for preparing a complex oxide powder according to claim 1, wherein the hydroxide of an element constituting the A site and the oxide powder of the element constituting the B site are weighed such that the mole ratio of the A-site element to the B-site element is in the range of about 0.990 to 1.010.

5. A method for preparing a complex oxide powder according to claim 1, wherein the reaction is performed under atmospheric pressure.

6. A method for preparing a complex oxide powder according to claim 1, wherein the reaction further comprises ultrasonication.

7. A method for preparing a complex oxide powder according to claim 6, wherein the reaction product has a specific surface area in the range of about 60 to 100 m²/g.

8. A method for preparing a complex oxide powder according to claim 1, further comprising dispersing the reaction product in a liquid.

9. A method for preparing a complex oxide powder according to claim 1, wherein the oxide of the B site element is anatase $TiO_2$.

* * * * *